US012287472B2

(12) United States Patent
Urashima et al.

(10) Patent No.: US 12,287,472 B2
(45) Date of Patent: Apr. 29, 2025

(54) PHASE-CONTRAST MICROSCOPE WITH RING-STRUCTURED FIBER LIGHTING AND A CONJUGATE-POSITIONED ANNULAR PHASE FILM

(71) Applicant: Panasonic Intellectual Property Management Co., Ltd., Osaka (JP)

(72) Inventors: Takashi Urashima, Osaka (JP); Daichi Higashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 640 days.

(21) Appl. No.: 17/723,530

(22) Filed: Apr. 19, 2022

(65) Prior Publication Data

US 2022/0373779 A1    Nov. 24, 2022

(30) Foreign Application Priority Data

May 21, 2021    (JP) ................................. 2021-086130

(51) Int. Cl.
  *G02B 21/14*    (2006.01)
  *F21V 8/00*    (2006.01)
  *G02B 19/00*    (2006.01)
  *G02B 21/02*    (2006.01)
  *G02B 6/08*    (2006.01)

(52) U.S. Cl.
  CPC .......... *G02B 21/14* (2013.01); *G02B 6/0008* (2013.01); *G02B 19/0047* (2013.01); *G02B 21/02* (2013.01); *G02B 6/08* (2013.01)

(58) Field of Classification Search
  CPC .... G02B 6/0008; G02B 6/08; G02B 19/0047; G02B 21/02; G02B 21/0056; G02B 21/14; G02B 27/0927; G02B 27/0994
  See application file for complete search history.

(56) References Cited

U.S. PATENT DOCUMENTS 4,318,886 A * 3/1982 Kawahara ............. G06M 11/04
                                              422/82.05
4,476,519 A * 10/1984 Hayamizu ............. G02B 21/14
                                              385/115

(Continued)

FOREIGN PATENT DOCUMENTS

CN          112075925          12/2020
JP          59-49514           3/1984

(Continued)

*Primary Examiner* — Andrew Jordan
(74) *Attorney, Agent, or Firm* — Wenderoth, Lind & Ponack L.L.P.

(57) ABSTRACT

A phase-contrast microscope includes a light source section configured to emit light; a light guide including a plurality of optical fibers, the light guide transmitting the light emitted from the light source section through the plurality of optical fibers; and an object lens including a lens and an annular phase film, the annular phase film being on the side to which light passes through the lens, the object lens being configured to enlarge an image on a sample irradiated with the light transmitted by the light guide. The plurality of optical fibers include a plurality of emission faces arranged to form a ring, and the light guide is disposed in such a manner that the plurality of emission faces are in a conjugate position to the annular phase film.

10 Claims, 10 Drawing Sheets

(56) References Cited

U.S. PATENT DOCUMENTS

| | | | | |
|---|---|---|---|---|
| 5,329,333 | A | | 7/1994 | Noguchi et al. |
| 5,446,540 | A | * | 8/1995 | Lin ........................ G02B 21/14 356/520 |
| 5,790,710 | A | * | 8/1998 | Price .................... G01N 15/147 250/201.3 |
| 5,808,790 | A | * | 9/1998 | Otaki ..................... B82Y 35/00 250/234 |
| 5,814,815 | A | * | 9/1998 | Matsumoto ........... H01J 37/263 250/311 |
| 5,926,311 | A | * | 7/1999 | Cobb .................... G02B 21/082 359/387 |
| 5,932,872 | A | * | 8/1999 | Price .................... G01N 15/147 250/201.3 |
| 5,952,562 | A | * | 9/1999 | Yagi ..................... G01Q 30/025 850/53 |
| 5,969,855 | A | * | 10/1999 | Ishiwata ................ G02B 21/14 359/371 |
| 6,488,398 | B1 | | 12/2002 | Bloch et al. |
| 7,944,608 | B2 | * | 5/2011 | Hayashi ............... G02B 26/007 359/227 |
| 9,261,690 | B2 | * | 2/2016 | Fukutake ............. G02B 21/367 |
| 9,322,822 | B2 | * | 4/2016 | Kuroda ............. G01N 21/6428 |
| 10,082,653 | B1 | * | 9/2018 | Liu ...................... G03H 1/0005 |
| 10,466,462 | B2 | * | 11/2019 | Shiraishi ................ G02B 21/14 |
| 10,649,192 | B2 | * | 5/2020 | Matsubara .......... G02B 21/244 |
| 10,769,773 | B2 | * | 9/2020 | Mendels ............. G02B 21/26 |
| 10,921,572 | B2 | * | 2/2021 | Schenk ................ G02B 21/365 |
| 10,939,026 | B2 | * | 3/2021 | Matsubara ........... G02B 21/245 |
| 11,243,386 | B2 | * | 2/2022 | Matsubara ............. G02B 7/28 |
| 11,860,355 | B2 | * | 1/2024 | Akiyama ............... G02B 21/24 |
| 12,001,940 | B2 | * | 6/2024 | Hong ................... G06T 7/0012 |
| 2002/0011566 | A1 | * | 1/2002 | Nagayama .............. H01J 37/28 250/311 |
| 2002/0148956 | A1 | * | 10/2002 | Piestrup .................. G21K 1/06 250/251 |
| 2005/0237605 | A1 | | 10/2005 | Vodyanoy et al. |
| 2007/0287124 | A1 | * | 12/2007 | Yamamoto ............ G09B 23/28 433/55 |
| 2008/0181363 | A1 | * | 7/2008 | Fenter ................... G01N 23/20 378/70 |
| 2008/0202918 | A1 | * | 8/2008 | Nagayama ............. H01J 37/26 427/596 |
| 2008/0267469 | A1 | * | 10/2008 | Kawabata .......... G01N 15/1433 382/128 |
| 2010/0053740 | A1 | * | 3/2010 | Nishiwaki .......... G02B 21/0056 359/370 |
| 2011/0155709 | A1 | | 6/2011 | Yamada et al. |
| 2012/0293644 | A1 | * | 11/2012 | Fukutake ............. G02B 21/365 348/79 |
| 2013/0299474 | A1 | | 11/2013 | Kashiwagi et al. |
| 2014/0170773 | A1 | * | 6/2014 | Kuroda ............. G01N 21/6428 436/501 |
| 2015/0192734 | A1 | | 7/2015 | Homma et al. |
| 2015/0309296 | A1 | * | 10/2015 | Dowaki ................. G02B 21/14 359/370 |
| 2016/0187635 | A1 | | 6/2016 | Arashi et al. |
| 2016/0366318 | A1 | * | 12/2016 | Matsubara ............. H04N 23/56 |
| 2017/0075097 | A1 | * | 3/2017 | Dowaki ............... G02B 21/361 |
| 2017/0322405 | A1 | * | 11/2017 | Matsubara ............... G02B 3/14 |
| 2018/0113294 | A1 | * | 4/2018 | Shiraishi ................ G02B 21/00 |
| 2018/0113295 | A1 | * | 4/2018 | Matsubara ............. G02B 7/282 |
| 2018/0129030 | A1 | * | 5/2018 | Schenk ................ G02B 21/361 |
| 2018/0224646 | A1 | * | 8/2018 | Wakui .................. G02B 21/086 |
| 2019/0130558 | A1 | * | 5/2019 | Mendels ............. G02B 21/362 |
| 2020/0145563 | A1 | * | 5/2020 | Matsubara ........... G02B 21/245 |
| 2022/0011562 | A1 | * | 1/2022 | Akiyama .............. G02B 21/26 |
| 2022/0156561 | A1 | * | 5/2022 | Hong ..................... G06N 3/084 |
| 2022/0373779 | A1 | * | 11/2022 | Urashima .......... G02B 21/0056 |
| 2023/0013209 | A1 | * | 1/2023 | Hong ................... G06V 20/698 |
| 2024/0011888 | A1 | * | 1/2024 | Hayden ................ G01N 1/4044 |
| 2024/0061314 | A1 | * | 2/2024 | Bauerschmidt ..... H01S 3/06741 |
| 2024/0118584 | A1 | * | 4/2024 | Ravensbergen .... H01S 3/06741 |
| 2024/0203685 | A1 | * | 6/2024 | Buijsse .................. H01J 37/20 |
| 2024/0344959 | A1 | * | 10/2024 | Hayden ............. G01N 15/1404 |
| 2024/0377310 | A1 | * | 11/2024 | Hayden ............. G01N 15/1433 |

FOREIGN PATENT DOCUMENTS

| | | |
|---|---|---|
| JP | 2-282202 | 11/1990 |
| JP | 2000-131616 | 5/2000 |
| JP | 2004-138620 | 5/2004 |
| JP | 2005-004088 | 1/2005 |
| JP | 2005-502083 | 1/2005 |
| JP | 2007-532982 | 11/2007 |
| JP | 2011-008188 | 1/2011 |
| JP | 2013-125064 | 6/2013 |
| JP | 2015-92611 | 5/2015 |
| JP | 2015-131733 | 7/2015 |
| JP | 2016-122027 | 7/2016 |
| JP | 2016-145874 | 8/2016 |
| JP | 2016-191957 | 11/2016 |
| WO | 03/021329 | 3/2003 |
| WO | 2010/007852 | 1/2010 |

* cited by examiner

PHASE-CONTRAST MICROSCOPE WITH RING-STRUCTURED FIBER LIGHTING AND A CONJUGATE-POSITIONED ANNULAR PHASE FILM

BACKGROUND

1. Technical Field

The present disclosure relates to a phase-contrast microscope.

2. Description of the Related Art

A well-known phase-contrast microscopes is disclosed in Patent Literature 1. In the microscope of Patent Literature 1, the ring slit is in a conjugate position to the phase film disposed on the phase plate in the object lens. In this microscope, the light source emits annular light which exits through the opening of the ring slit, passes through the Condenser lens, and is applied to the sample. The image on the sample irradiated with the light is enlarged by the object lens.

CITATION LIST

Patent Literature

Patent Literature 1: Japanese Unexamined Patent Application Publication No. 2016-122027

SUMMARY

The phase-contrast microscope of the present disclosure includes the following components: a light source section configured to emit light; a light guide including a plurality of optical fibers, the light guide transmitting the light emitted from the light source section through the plurality of optical fibers; and an object lens including a lens and an annular phase film, the annular phase film being on a side to which light passes through the lens, the object lens being configured to enlarge an image on a sample irradiated with the light transmitted by the light guide. The plurality of optical fibers include a plurality of emission faces arranged to form a ring. The light guide is disposed in such a manner that the plurality of emission faces are in a conjugate position to the annular phase film.

DETAILED DESCRIPTIONS

A phase-contrast microscope disclosed in Patent Literature 1 cannot be compact because emitting annular light to the Condenser lens requires that the optical system including a ring slit and a lens should be disposed between the light source and the Condenser lens.

An object of the present disclosure is to provide a compact phase-contrast microscope.

First Embodiment

A first embodiment of the present disclosure will be described as follows.

Structure of the Phase-Contrast Microscope

Figure 1:
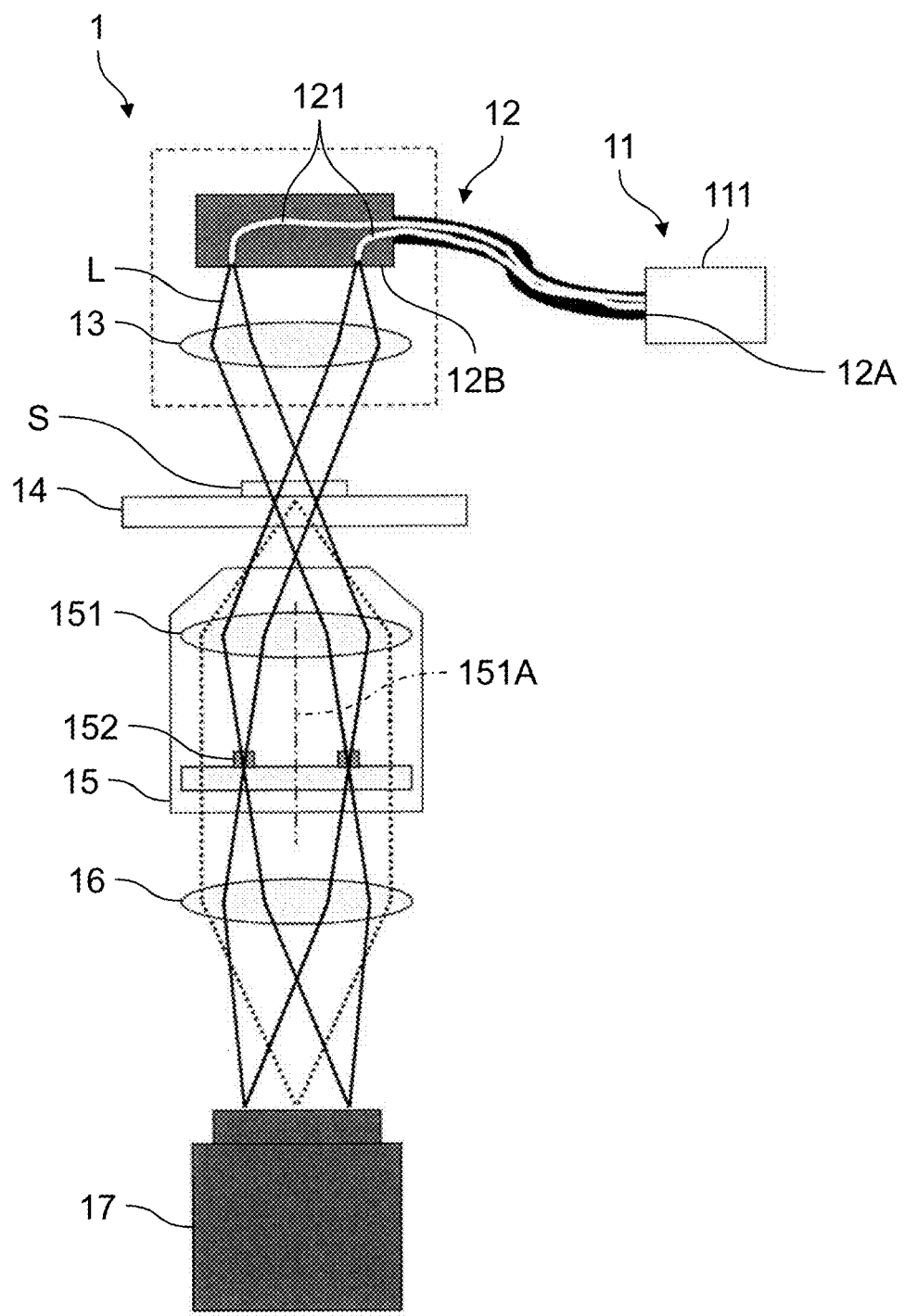
FIG. 1 is a schematic diagram of a phase-contrast microscope according to a first embodiment.

First, the structure of the phase-contrast microscope will now be described. FIG. 1 is a schematic diagram of a phase-contrast microscope according to the first embodiment.

In FIG. 1, phase-contrast microscope 1 includes light source section 11, light guide 12, Condenser lens 13, sample stage 14, object lens 15, imaging lens 16, and two-dimensional image sensor 17.

Light source section 11 includes one light source 111. Light source 111 is, for example, a light-emitting diode (LED), but may alternatively be a halogen lamp, a semiconductor laser, or other similar devices.

Light guide 12 is a bundle of optical fibers 121 for transmitting light from light source 111. The incident face of light guide 12 is connected to light source 111, and the emission face of light guide 12 is disposed to face Condenser lens 13. Light guide 12 will be described in detail later.

Condenser lens 13 causes light L exiting through light guide 12 to be applied to a sample S placed on sample stage 14.

Object lens 15, which is designed for phase contrast observation, enlarges the sample S irradiated with the light L. Object lens 15 includes lens 151 and annular phase film 152. Lens 151 is disposed closer to the sample S than phase film 152 is. In other words, lens 151 is disposed on the side on which the light emitted from light source section 11 enters. Phase film 152 is disposed in such a manner that the center of the annular light is aligned with optical axis 151A of lens 151 on the light emission side of lens 151. Phase film 152 has the function of shifting the phase of incident light by ¼ wavelength.

Imaging lens 16 is combined with object lens 15 to enlarge the image of the sample S, thereby producing an image on the detector plane of two-dimensional image sensor 17.

Two-dimensional image sensor 17 converts the image of the sample S into a digital signal. Sensor 17 is typically either a complementary metal oxide semiconductor (CMOS) sensor or a charge coupled device (CCD) sensor.

Description of the Main Components of the Phase-Contrast Microscope

Figure 2A:
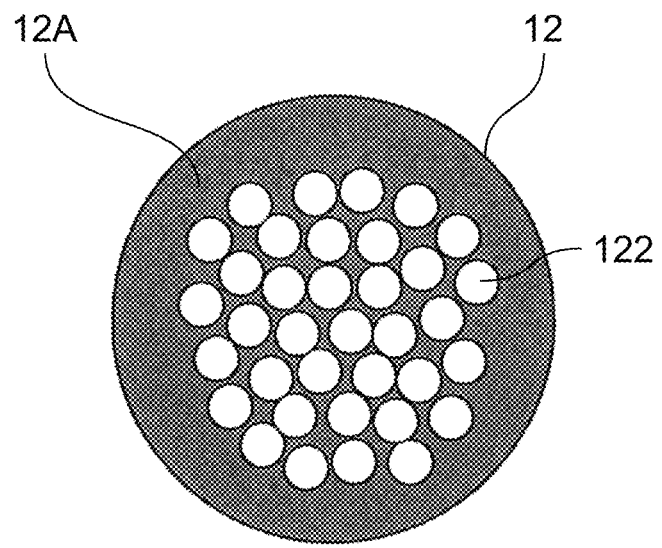
FIG. 2A is a schematic diagram of the end face of a light guide through which light enters in the first embodiment.
Figure 2B:
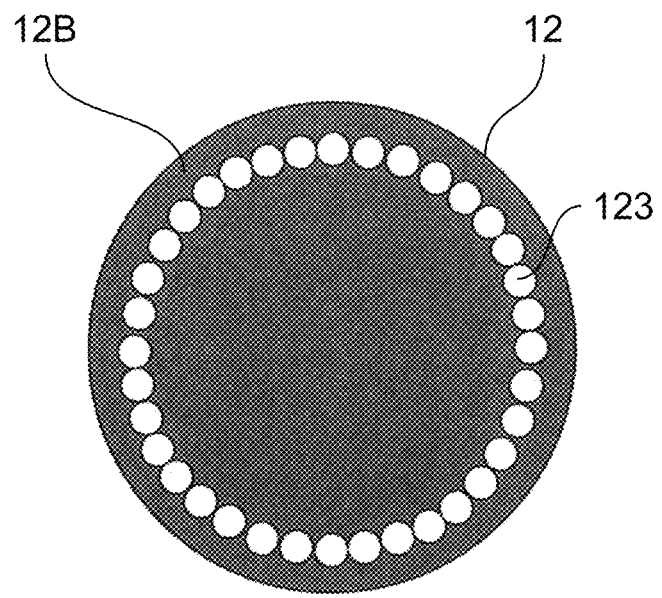
FIG. 2B is a schematic diagram of the end face of the light guide through which light exits in the first embodiment.
Figure 3:
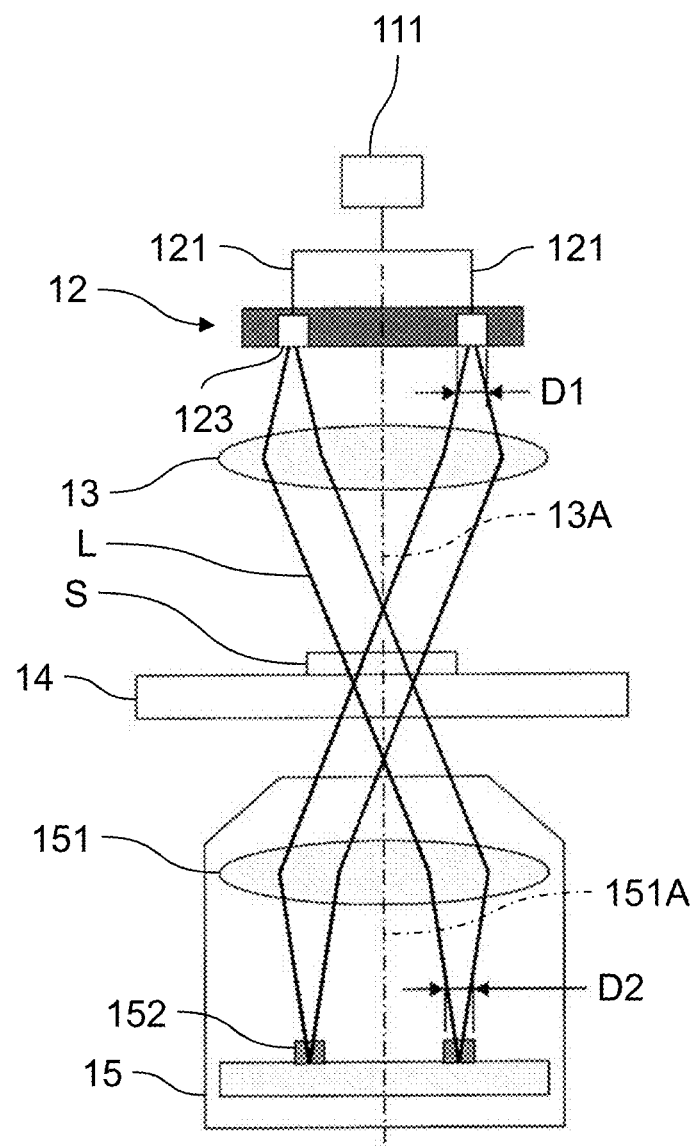
FIG. 3 is a schematic diagram of the main components of the phase-contrast microscope according to the first embodiment.
Figure 4A:
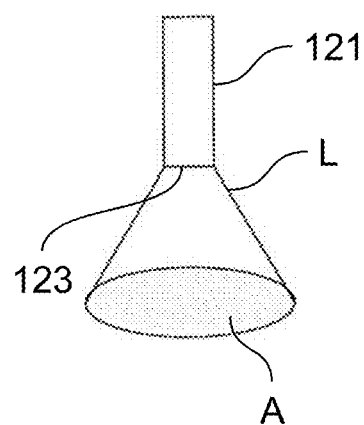
FIG. 4A is a schematic diagram in which light passing through the optical fibers has a uniform intensity distribution at the exit angle in the first embodiment.
Figure 4B:
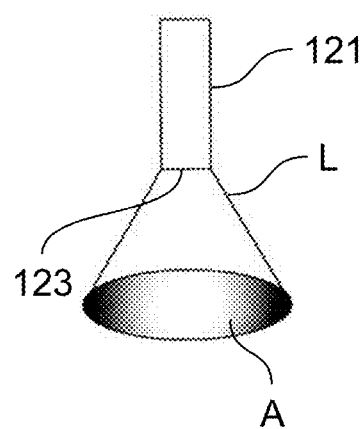
FIG. 4B is a schematic diagram in which the light passing through the optical fibers has a nonuniform intensity distribution at the exit angle in the first embodiment.

The main components of phase-contrast microscope 1 will be described as follows. FIG. 2A is a schematic diagram of the end face of the light guide through which light enters. FIG. 2B is a schematic diagram of the end face of the light guide through which light exits. FIG. 3 is a schematic diagram of the main components of the phase-contrast microscope. FIG. 4A is a schematic diagram in which the light passing through the optical fibers has a uniform intensity distribution at the exit angle. FIG. 4B is a schematic diagram in which the light passing through the optical fibers has a nonuniform intensity distribution at the exit angle.

As shown in FIG. 2A, optical fibers 121 have light incident faces 122 on the side of light guide 12 on which light enters. Light incident faces 122 are arranged to form a circle on end face 12A of light guide 12 which is opposite light source 111. Meanwhile, as shown in FIG. 2B, optical fibers 121 have light emission faces 123 on the side of light guide 12 on which light exits. Light emission faces 123 are arranged to form a ring on end face 12B of light guide 12 which is opposite the incident face of Condenser lens 13. Emission faces 123 in the form of a ring in optical fibers 121 are disposed at the position of the pupil of the illumination optical system for applying light to the sample S.

In FIG. 3, light guide 12 is disposed in the following manner. First, the distance from emission faces 123 of optical fibers 121 to Condenser lens 13 is approximately equal to the focal length of Condenser lens 13. Second, emission faces 123 of optical fibers 121 are arranged to form a ring around the optical axis 13A of Condenser lens 13. Third, emission faces 123 arranged to form a ring, or the pupil of the illumination optical system is in an optically conjugate position to phase film 152. Here, the conjugate position means a position where the same images with different magnification factors can be obtained. Light guide 12 is preferably disposed in such a manner that the direction of travel of the light L passing through optical fibers 121 is parallel with the optical axis 13A of Condenser lens 13. In other words, light guide 12 is preferably disposed in such a manner that emission faces 123 of optical fibers 121 are approximately perpendicular to the optical axis 13A of Condenser lens 13.

Suppose that the core of optical fibers 121 has a diameter D1, phase film 152 has a width D2, and lens 151 has an imaging magnification β. Then, optical fibers 121 and phase film 152 are preferably designed to satisfy the following expression (1):

$$D1 < D2/\beta \quad (1)$$

Assume that optical fibers 121 and phase film 152 are designed in such a manner that the diameter D1 of the core does not exceed the value obtained by dividing the width D2 of phase film 152 by the imaging magnification. In this case, the light passing through optical fibers 121 and proceeding straight (not diffracting at the sample S), can enter phase film 152.

As shown in FIGS. 4A and 4B, the light L exiting through emission faces 123 of optical fibers 121 spreads out radially. The intensity distribution A of the light L at the exit angle is preferably uniform as shown in FIG. 4A, but may alternatively be nonuniform as shown in FIG. 4B. To make the intensity distribution A uniform, optical fibers 121 are preferably made of multi-mode fibers.

Operations of Phase-Contrast Microscope

Phase-contrast microscope 1 operates as follows. As shown in FIG. 1, light emitted from light source 111 enters light guide 12 and exits through end face 12B, which is on the light emission side. At this moment, light guide 12 emits ring-shaped light L because emission faces 123 of optical fibers 121 are arranged to form a ring on end face 12B. Thus, according to phase-contrast microscope 1, the ring-shaped light L can be emitted without disposing an optical system including a ring slit and a lens between light source 111 and Condenser lens 13, enabling microscope 1 to be compact. Furthermore, phase-contrast microscope 1 can be easily incorporated into an automatic cell culture device or other similar devices that can afford limited space for microscope 1.

After passing through light guide 12, the ring-shaped light L passes through Condenser lens 13 and is applied to, for example, a colorless transparent sample S. After passing through the sample S, the light L passes through object lens 15 and imaging lens 16, and is then formed into an image on the detector plane of two-dimensional image sensor 17. Emission faces 123 of optical fibers 121 arranged to form a ring are in an optically conjugate position to phase film 152, thereby allowing capturing phase-contact images.

Second Embodiment

Figure 5:
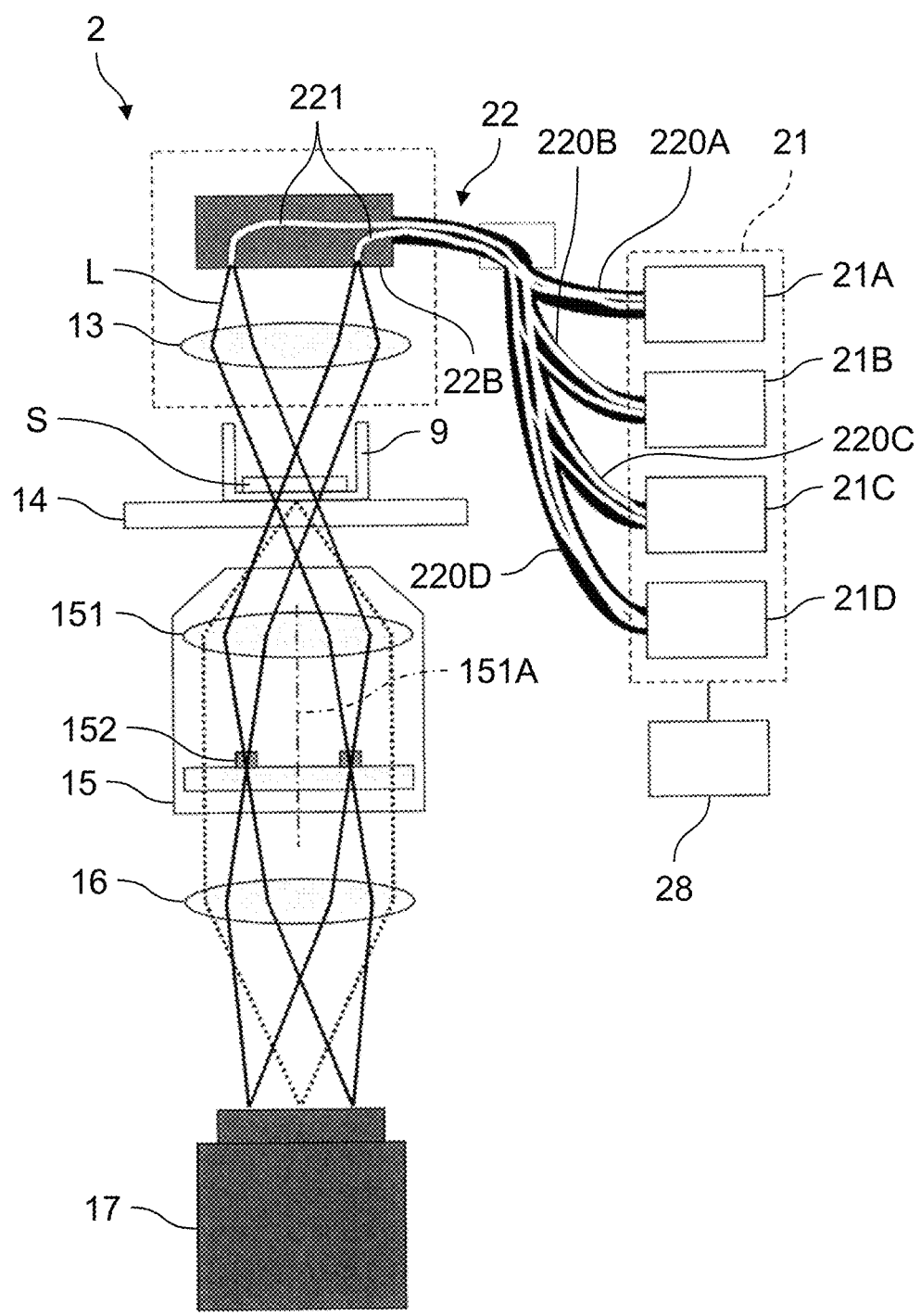
FIG. 5 is a schematic diagram of a phase-contrast microscope according to a second embodiment.
Figure 6:
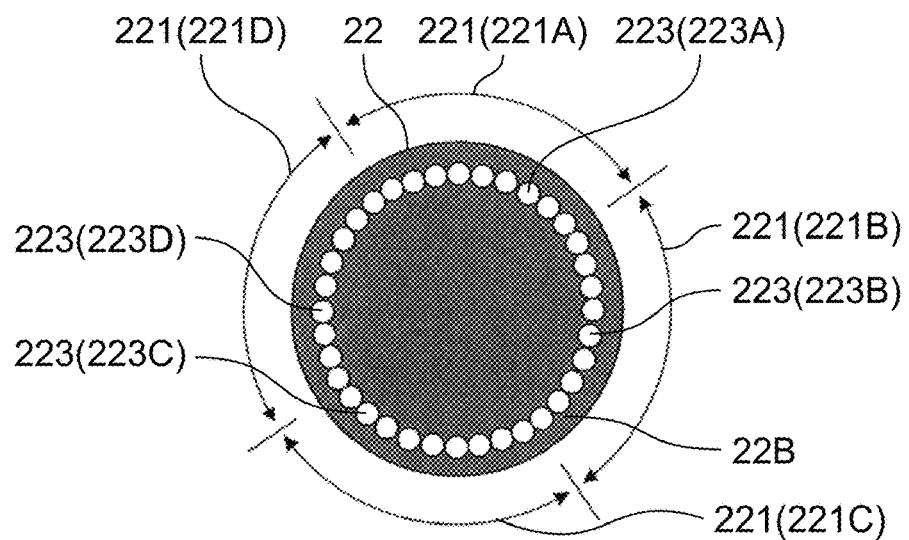
FIG. 6 is a schematic diagram showing how the first to fourth emission faces of the first to fourth optical fibers are arranged in the second embodiment.
Figure 7:
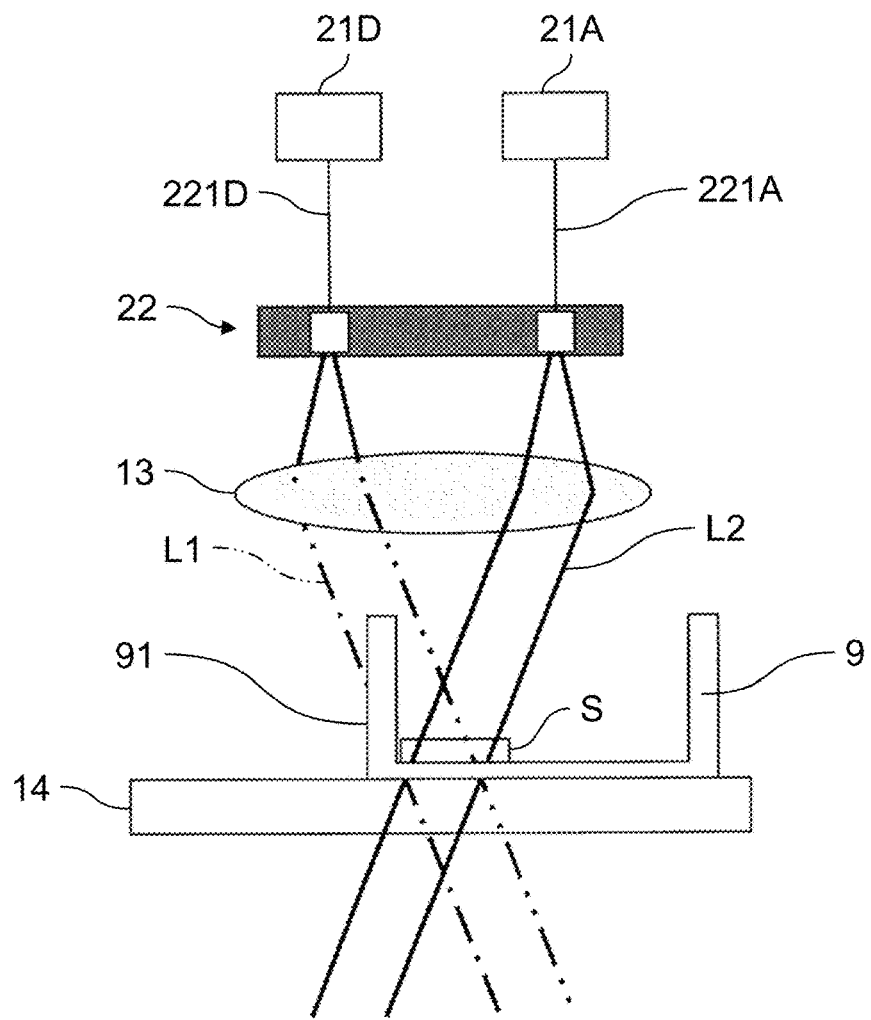
FIG. 7 is a schematic diagram of an example of light irradiation control in the second embodiment.

A phase-contrast microscope according to a second embodiment of the present disclosure will be described as follows. Note that the same components as those of phase-contrast microscope 1 of the first embodiment will be denoted by the same reference numerals, and the description thereof will be omitted. FIG. 5 is a schematic diagram of the phase-contrast microscope according to the second embodiment. FIG. 6 is a schematic diagram showing how the first to fourth emission faces of the first to fourth optical fibers are arranged. FIG. 7 is a schematic diagram of an example of light irradiation control.

In FIG. 5, phase-contrast microscope 2 of the second embodiment has the function of separately emitting a plurality of arcs of light composing ring-shaped light. For example, an arc of light selected based on where in container 9 the sample S is placed is applied to the sample S. Phase-contrast microscope 2 differs from phase-contrast microscope 1 of the first embodiment in the following two aspects. First, microscope 2 has controller 28. Second, microscope 2 has light source section 21 and light guide 22, which have different structures from light source section 11 and light guide 12, respectively, of microscope 1.

Light source section 21 includes first light source 21A, second light source 21B, third light source 21C, and fourth light source 21D. Light source section 21 includes four light sources in the second embodiment, but may alternatively include two, three, five, or more light sources.

Light guide 22 is branched into the same number as the light sources at its end on which light guide 22 is connected to the light sources of light source section 21. The end of light guide 22 is branched into four in the second embodiment. Hereinafter, the four branches of light guide 22 will be sometimes referred to as first branch 220A, second branch 220B, third branch 220C, and fourth branch 220D.

Each of first branch 220A, second branch 220B, third branch 220C, and fourth branch 220D is provided with a bundle of optical fibers 221. Hereinafter, optical fibers 221 provided in first branch 220A, second branch 220B, third branch 220C, and fourth branch 220D will be sometimes referred to as first optical fibers 221A, second optical fibers 221B, third optical fibers 221C, fourth optical fibers 221D, respectively (see FIG. 6). Note that first-fourth optical fibers 221A-221D may contain the same or different number of fibers from each other.

As shown in FIG. 6, optical fibers 221 have emission faces 223 arranged to form a ring on end face 22B of light guide 22 through which light exits. Emission faces 223 of first-fourth optical fibers 221A-221D are arranged to form different arc regions of the ring. Hereinafter, emission faces 223 of first optical fibers 221A, second optical fibers 221B, third optical fibers 221C, and fourth optical fibers 221D will be sometimes referred to as first emission faces 223A, second emission faces 223B, third emission faces 223C, and fourth emission faces 223D, respectively. In light guide 22, emission faces 223 arranged to form a ring are in an optically conjugate position to phase film 152.

As shown in FIG. 5, first to fourth branches 220A, 220B, 220C, and 220D are connected to first to fourth light sources 21A, 21B, 21C, and 21D, respectively. This structure enables the light emitted from first-fourth light sources 21A-21D to exit through emission faces 223 having different arc regions which together form a ring. In other words, the light emitted from first-fourth light sources 21A-21D exits through first-fourth emission faces 223A-223D, respectively as arcs of light.

Controller 28 causes light to be emitted from at least one light source selected among first-fourth light sources 21A-21D, so that the light exits through emission faces 223 that form at least one of the different arc regions that together form a ring. For example, as shown in FIG. 7, assume that the sample S is placed in container 9 with a high aspect ratio such as a well plate at a position near wall surface 91. In this case, controller 28 causes fourth light source 21D not to emit arc light L1 shown by a two-dot chain line, but causes first light source 21A to emit arc light L2 shown by the solid line. The arc light L1 interferes with wall surface 91 whereas the arc light L2 does not interfere with wall surface 91. Such illumination control with controller 28 achieves good phase-contact images regardless of the shape or material of container 9 in which the sample S is placed or regardless of where in container 9 the sample S is placed. The light source to emit light can be selected by controller 28 either based on the result of the detection made by an unillustrated sensor for detecting the spatial relationship between wall surface 91 and the sample S or based on the user's operation of an unillustrated operation section.

Note that controller 28 may cause two or three light sources among first-fourth light sources 21A-21D to emit light at the same time. This enables the sample S to be irradiated with arc light with a larger central angle than in the case where a single light source emits light. Furthermore, when none of the light emitted from all the light sources in light source section 21 interferes with wall surface 91, controller 28 may cause all the light sources to emit light at the same time so that the sample S can be irradiated with annular light.

Third Embodiment

Figure 8:
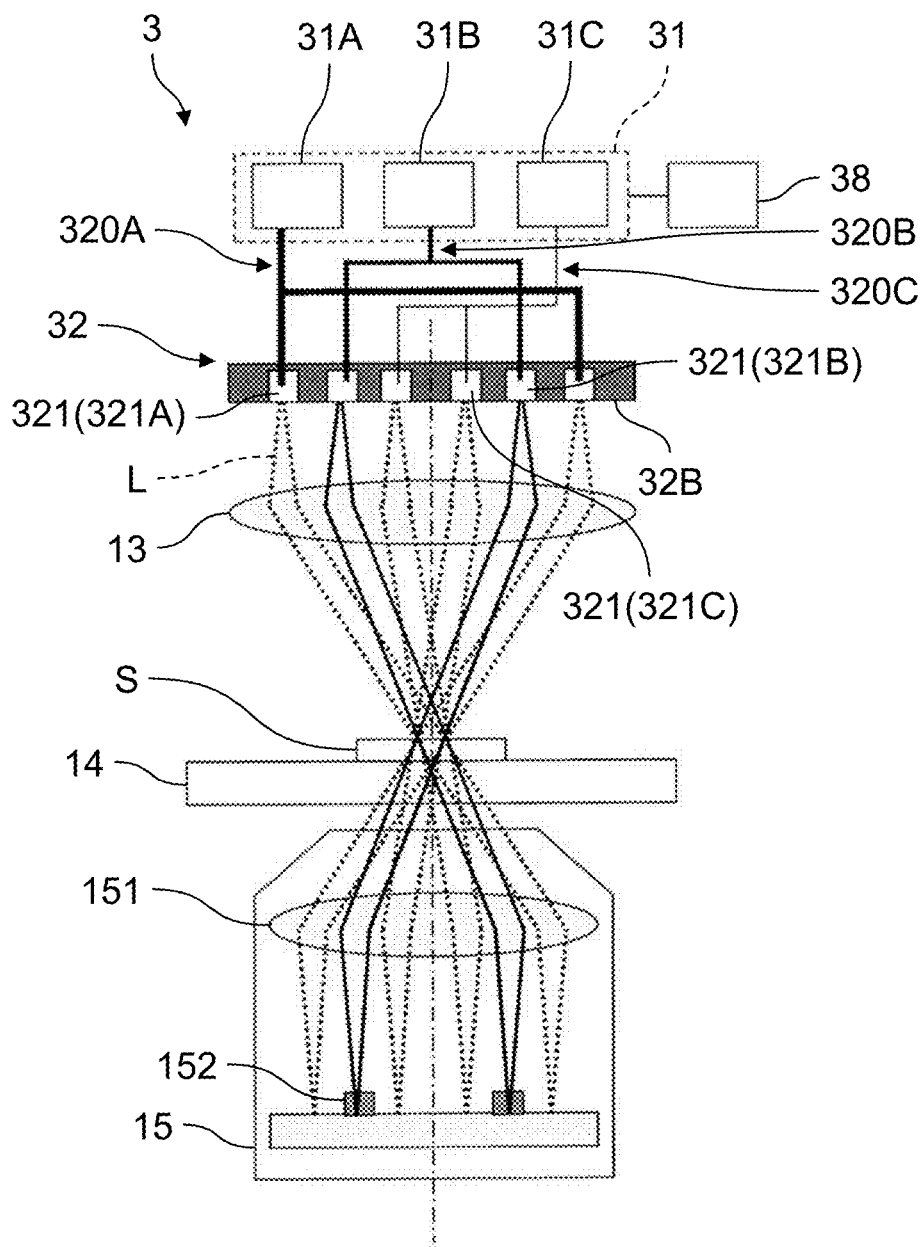
FIG. 8 is a schematic diagram of the main components of a phase-contrast microscope according to a third embodiment.
Figure 9:
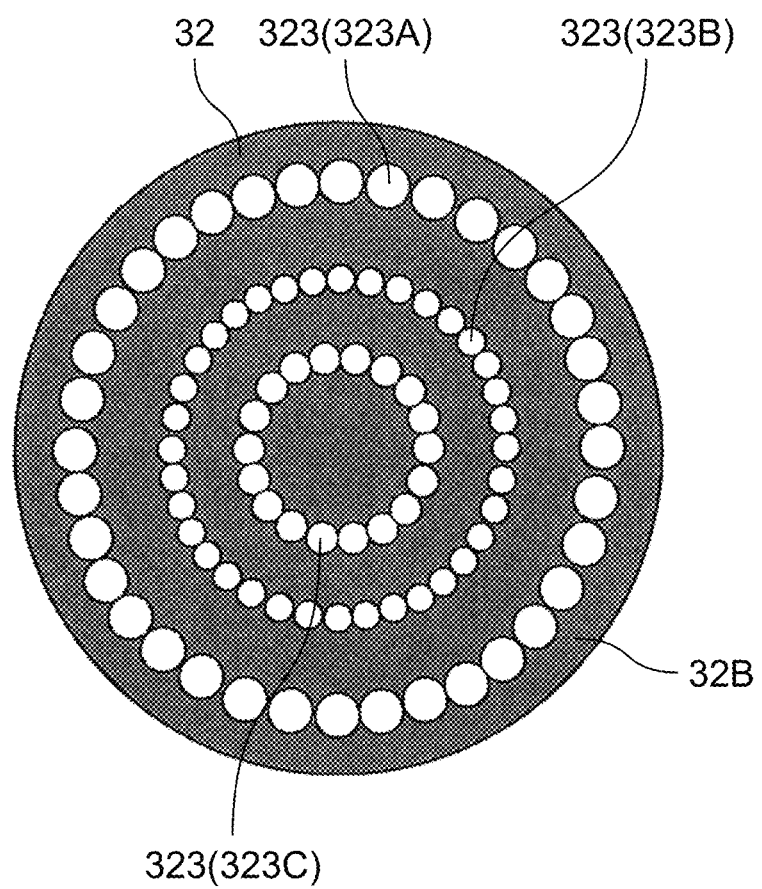
FIG. 9 is a schematic diagram showing how the first to third emission faces of the first to third optical fibers are arranged in the third embodiment.

A phase-contrast microscope according to a third embodiment of the present disclosure will be described as follows. Note that the same components as those of phase-contrast microscope 1 of the first embodiment will be denoted by the same reference numerals, and the description thereof will be either simplified or omitted. FIG. 8 is a schematic diagram of the main components of the phase-contrast microscope according to the third embodiment. FIG. 9 is a schematic diagram showing how the first to third emission faces of the first to third optical fibers are arranged.

In FIG. 8, phase-contrast microscope 3 of the third embodiment has the function of separately emitting a plurality of concentric rings of light. Microscope 3 irradiates the sample S with one ring of light selected based on the magnification of object lens 15. Phase-contrast microscope 3 differs from phase-contrast microscope 1 of the first embodiment in the following three aspects. First, microscope 3 has controller 38. Second, microscope 3 has light source section 31 and light guide 32, which have different structures from light source section 11 and light guide 12, respectively, of microscope 1. Third, microscope 3 can change the magnification of object lens 15.

Light source section 31 includes first light source 31A, second light source 31B, and third light source 31C. Light source section 31 includes three light sources in the third embodiment, but may alternatively include two, four, or more light sources.

Light guide 32 is branched into the same number as the light sources at its end on which light guide 32 is connected to the light sources of light source section 31. The end of light guide 32 is branched into three in the third embodiment. Hereinafter, the three branches of light guide 32 will be sometimes referred to as first branch 320A, second branch 320B, and third branch 320C.

Each of first branch 320A, second branch 320B, and third branch 320C is provided with a bundle of optical fibers 321. Hereinafter, optical fibers 321 provided in first branch 320A, second branch 320B, and third branch 320C will be sometimes referred to as first optical fibers 321A, second optical fibers 321B, and third optical fibers 321C, respectively (see FIG. 9). Note that first-third optical fibers 321A-321C may contain the same or different number of fibers from each other.

As shown in FIG. 9, first optical fibers 321A, second optical fibers 321B, and third optical fibers 321C each have emission faces 323 arranged to form concentric three rings on end face 32B of light guide 32 on which light exits. Hereinafter, the emission faces 323 of first optical fibers 321A, which form the largest ring of the three, will be sometimes referred to as first emission faces 323A; the emission faces 323 of second optical fibers 321B, which form the second largest ring of the three, will be sometimes referred to as second emission faces 323B; and the emission faces 323 of third optical fibers 321C, which form the smallest ring of the three, will be sometimes referred to as third emission faces 323C. In light guide 32, emission faces 323 arranged to form rings are in an optically conjugate position to phase film 152.

As shown in FIG. 8, first, second, and third branches 320A, 320B, and 320C are connected to first, second, and third light sources 31A, 31B, and 31C, respectively. This structure enables the light emitted from first-third light sources 31A-31C to exit through emission faces 323, which are arranged in different-sized rings. Thus, the light emitted from first-third light sources 31A-31C exits through first-third emission faces 323A-323C as different-sized rings of light.

As described above, phase-contrast microscope 3 of the third embodiment can change the magnification of object lens 15. To change the magnification of object lens 15, at least one of the size of phase film 152 and the distance between phase film 152 and lens 151 is changed. Consequently, capturing good phase-contact images while maintaining the conjugate relation between phase film 152 and the pupil of the illumination optical system (the position of emission faces 23) requires changing the size of the ring of light exiting through light guide 32. According to the microscope disclosed in Patent Literature 1, a plurality of ring slits through which different-sized rings of light exit are held by a slider, and the slider is moved based on the magnification of the object lens so as to switch the lens slit to be used to emit light.

Meanwhile, controller 38 causes light to be emitted from a light source selected based on the magnification of object lens 15 among first to third light sources 31A to 31C. This enables light to exit through, among emission faces 323 forming the plurality of concentric rings, emission faces 323 that form a ring whose size allows maintaining a conjugate relation between phase film 152 and the pupil of the illumination optical system. This control enables the sample S to be irradiated with a ring of light whose size allows maintaining the conjugate relation between phase film 152 and the pupil of the illumination optical system, regardless of the magnification of object lens 15. This achieves capturing good phase-contact images. Furthermore, the emission of the three light sources of light source section 31 is controlled to change the size of the light exiting through light guide 32. This can reduce the size of phase-contrast microscope 3 and also increase the speed of switching the size of light according to the magnification of object lens 15. The light source to emit light can be selected by controller 38 based on the result of the detection made by an unillustrated sensor for detecting the magnification of object lens 15, or based on the user's operation of an unillustrated operation section.

Furthermore, to capture a bright-field image, controller 38 can cause one of first-third light sources 31A-31C to emit light selectively so that light guide 32 can emit a ring of light whose size does not provide a conjugate relation between phase film 152 and the pupil of the illumination optical system. This control enables high-speed switching between capturing phase-contact images and capturing bright-field images.

Fourth Embodiment

Figure 10:
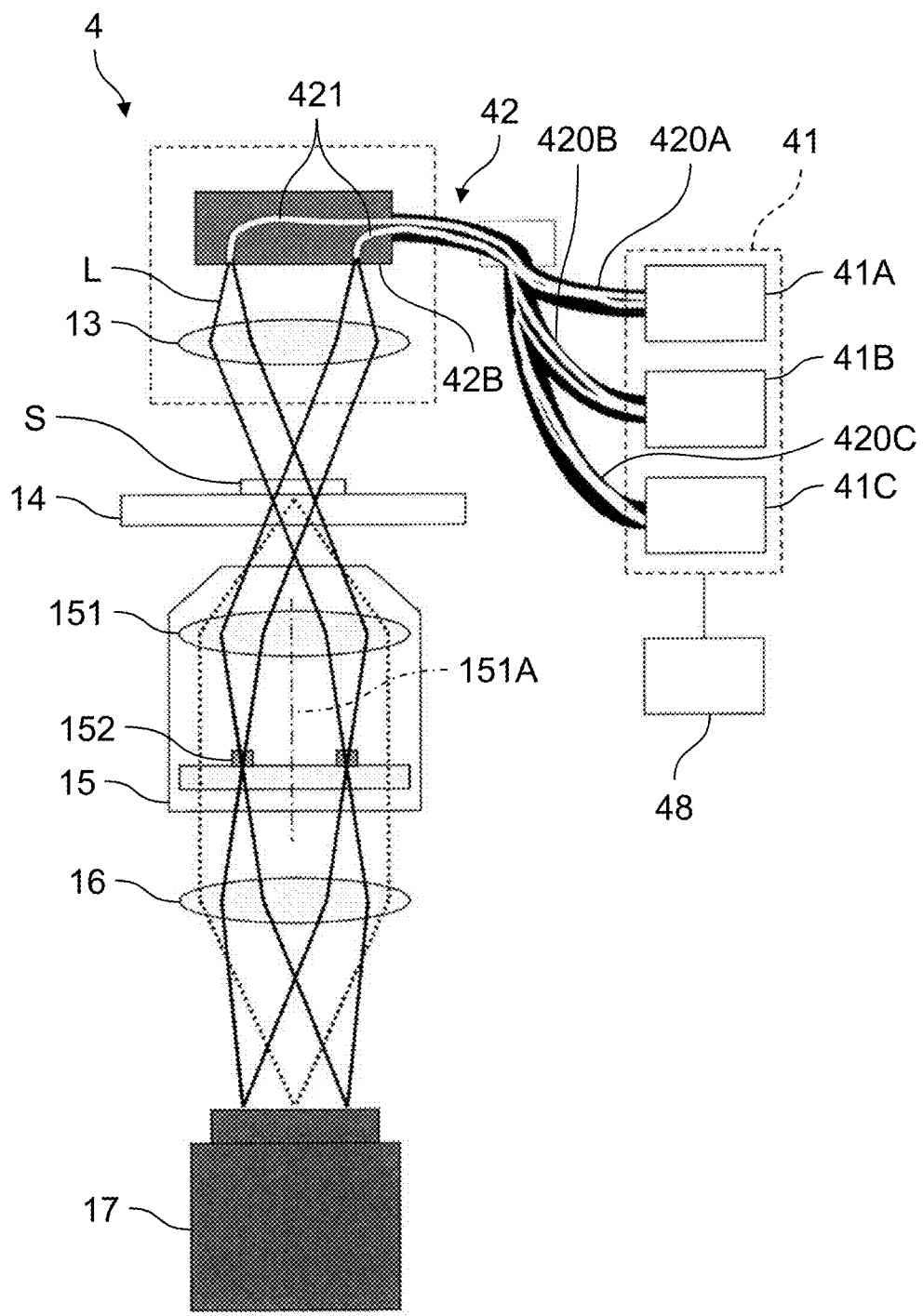
FIG. 10 is a schematic diagram of a phase-contrast microscope according to a fourth embodiment.
Figure 11:
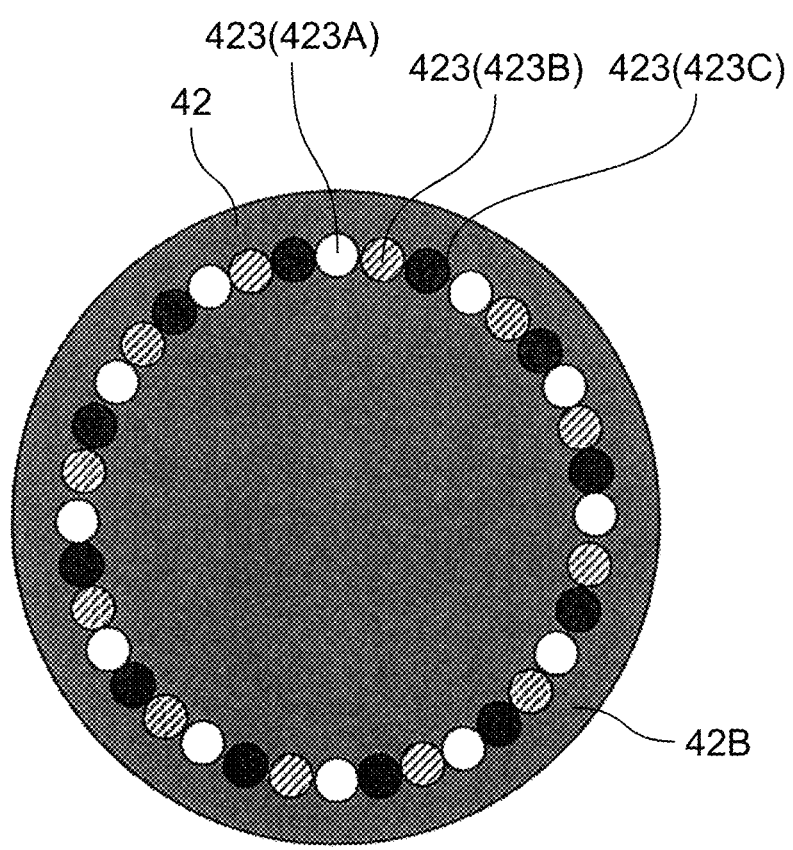
FIG. 11 is a schematic diagram showing how the first to third emission faces of the first to third optical fibers are arranged.

A phase-contrast microscope according to a fourth embodiment of the present disclosure will be described as follows. Note that the same components as those of phase-contrast microscope 1 of the first embodiment will be denoted by the same reference numerals, and the description thereof will be either simplified or omitted. FIG. 10 is a schematic diagram of the phase-contrast microscope according to the fourth embodiment. FIG. 11 is a schematic diagram showing how the first to third emission faces of the first to third optical fibers are arranged.

In FIG. 10, phase-contrast microscope 4 of the fourth embodiment has the function of irradiating the sample S with a plurality of light beams with different peak wavelengths. Microscope 4 can irradiate the sample S with one of the light beams with different peak wavelengths. Phase-contrast microscope 4 differs from phase-contrast microscope 1 of the first embodiment in the following two aspects. First, microscope 4 has controller 48. Second, microscope 4 has light source section 41 and light guide 42, which have different structures from light source section 11 and light guide 12, respectively, of microscope 1.

Light source section 41 includes first light source 41A, second light source 41B, and third light source 41C. Light source section 41 includes three light sources in the fourth embodiment, but may alternatively include two, four, or more light sources. First to fourth light sources 41A to 41C emit light of different peak wavelengths.

Light guide 42 is branched into the same number as the light sources at its end on which light guide 42 is connected to the light sources of light source section 41. The end of light guide 42 is branched into three in the fourth embodiment. Hereinafter, the three branches of light guide 42 will be sometimes referred to as first branch 420A, second branch 420B, and third branch 420C.

Each of first branch 420A, second branch 420B, and third branch 420C is provided with a bundle of optical fibers 421. Hereinafter, optical fibers 421 provided in first branch 420A, second branch 420B, and third branch 420C will be sometimes referred to as first optical fibers 421, second optical fibers 421, and third optical fibers 421. Note that first-third optical fibers 421 may contain the same or different number of fibers from each other.

As shown in FIG. 11, emission faces 423 of first to third optical fibers 421 are arranged to form respective rings on end face 42B of light guide 42 through which light exits. Hereinafter, emission faces 423 of first optical fibers 421, second optical fibers 421, and third optical fibers 421 will be sometimes referred to as first emission faces 423A, second emission faces 423B, and third emission faces 423C, respectively. First to third emission faces 423A, 423B, and 423C are each arranged at regular intervals around the circumference of the respective rings. In other words, first to third emission faces 423A, 423B, and 423C are arranged to form three rings of the same size.

First to third branches 420A, 420B, and 420C are connected to first to third light sources 41A, 41B, and 41C, respectively. With this configuration, first to third emission faces 423A to 423C through which light beams of different peak wavelengths exit are arranged in a fixed order repeatedly around the circumference of the rings. The light beams of different peak wavelengths emitted from first-third light sources 41A-41C exit through first-third emission faces 423A-423C in the form of the same-sized rings of light.

Controller 48 causes light to be emitted from one light source selected among first to third light sources 41A, 41B, and 41C based, for example, on the color of a transparent sample S. As a result, among the plurality of light beams with different peak wavelengths, the light beam of a predetermined peak wavelength exits through the corresponding emission faces 323 and spreads radially. This control enables the sample S to be irradiated with a ring of light which has a wavelength suitable for capturing phase-contact images of the sample S and which exits through the emission faces 323 that is disposed in a conjugate portion to phase film 152. As a result, good phase-contact images can be captured. Furthermore, controller 48 may cause any two of first-third light source 41A-41C to emit light at the same time, and alternatively may cause all of first-third light source 41A-41C to emit light at the same time. Furthermore, the light source to emit light can be selected by controller 48, for example, based on the result of the detection made by an unillustrated sensor for detecting the color of the sample S, or based on the user's operation of an unillustrated operation section.

Modified Example

It goes without saying that the present disclosure is not limited to the embodiments described so far; various modifications can be added as long as they do not deviate from the spirit of the present invention.

Optical fibers 121, 221, 321, and 421 each contain a core and a clad covering the core. Optical fibers 121, 221, 321, and 421 are connected to the light sources included in light source section 11, 21, 31, and 41, respectively, through a coupling. In general, light passes through the core; however, light leaking from the coupling or the core may propagate through the clad. In such cases, if light passes through the clad and the outside of phase film 152, image contrast is reduced. To solve this, the clad-mode light passing through the clad must be removed. To achieve this removal, a clad-mode-light removing section may be provided in phase-contrast microscopes 1, 2, 3, and 4, and in particular in light guides 12, 22, 32, and 42. An example of the clad-mode-light removing section to be provided in phase-contrast microscopes 1, 2, 3, and 4 is a mandrel for bending optical fibers 121, 221, 321, and 421 within a radius that allows the removal of clad-mode light. An example of the clad-mode-light removing section to be provided in light guides 12, 22, 32, and 42 is a material that matches the refractive index of the clad. This material can be applied and left on the clad to remove the clad-mode light.

In second embodiment, first-fourth light sources 21A-21D are separately controlled to emit arc light to the sample S. An alternative method is as follows. Only one light source is provided, and a mask with, for example, an arc slit is formed in end face 22B of light guide 22 and is rotated by controller 28 to apply arc light that does not interfere with wall surface 91.

In the fourth embodiment, first to third light sources 41A to 41C that emit different peak wavelengths are used. An alternative method is as follows. Only one light source for emitting predetermined light is provided, and only one filter among a plurality of filters that transmit light of different peak wavelengths is disposed in front of end face 42B of light guide 42 by the control of controller 48.

The configuration of the second embodiment may be applied to the third embodiment in such a manner that the sample S is irradiated with arc light that belongs to one of the three concentric rings. Furthermore, the configuration of the fourth embodiment may be applied to the third embodiment in such a manner that emission faces through which light beams with different peak wavelengths exit are disposed at regular intervals around the circumference of each of the three rings.

Thus, the present disclosure enables achieving a compact phase-contrast microscope.

INDUSTRIAL APPLICABILITY

The present disclosure provides a compact phase-contrast microscope that can visualize transparent samples. This microscope is applicable to inspection and other uses in the industrial field.

REFERENCE NUMERALS 1, 2, 3, 4 phase-contrast microscope
9 container
11, 21, 31, 41 light source section
12, 22, 32, 42 light guide
12A, 12B, 22B, 32B, 42B end face
13 Condenser lens
13A optical axis
14 sample stage
15 object lens
16 imaging lens
17 two-dimensional image sensor
21A, 31A, 41A first light source
21B, 31B, 41B second light source
21C, 31C, 41C third light source
21D fourth light source
28, 38, 48 controller
91 wall surface
111 light source
121, 221, 321, 421 optical fiber
122 incident face
123, 223, 323, 423 emission face
151 lens
151A optical axis
152 phase film
220A, 320A, 420A first branch
220B, 320B, 420B second branch
220C, 320C, 420C third branch
220D fourth branch
221A, 321A, 421 first optical fiber
221B, 321B, 421 second optical fiber
221C, 321C, 421 third optical fiber
221D fourth optical fiber
223A, 323A, 423A first emission face
223B, 323B, 423B second emission face
223C, 323C, 423C third emission face
223D fourth emission face
A intensity distribution
L, L1, L2 light
S sample

What is claimed is:

1. A phase-contrast microscope comprising:
   a light source section configured to emit light;
   a light guide comprising a plurality of optical fibers, the light guide transmitting the light emitted from the light source section through the plurality of optical fibers; and
   an object lens comprising a lens and an annular phase film, the annular phase film being on a side to which light passes through the lens, the object lens being configured to enlarge an image on a sample irradiated with the light transmitted by the light guide,
   wherein
   the plurality of optical fibers comprise a plurality of emission faces arranged to form a ring, and
   the light guide is disposed in such a manner that the plurality of emission faces are in a conjugate position to the annular phase film.

2. The phase-contrast microscope according to claim 1 further comprising a controller configured to cause light to exit through at least one emission face selected among the plurality of emission faces.

3. The phase-contrast microscope according to claim 2, wherein
   the light source section comprises a plurality of light sources configured to emit light to the plurality of optical fibers, and
   the controller causes at least one light source selected among the plurality of light sources to emit light through the at least one emission face.

4. The phase-contrast microscope according to claim 2, wherein
   the ring formed by the plurality of emission faces comprises a plurality of arc regions, and
   the controller causes light to exit through at least one emission face among the plurality of emission faces, the at least one emission face forming an arc region selected among the plurality of arc regions.

5. The phase-contrast microscope according to claim 2, wherein
the plurality of emission faces are arranged to form a plurality of concentric rings, and
the controller causes light to exit through at least one emission face among the plurality of emission faces, the at least one emission face forming a ring selected among the plurality of concentric rings.

6. The phase-contrast microscope according to claim 2, wherein
the plurality of emission faces emit a plurality of light beams with different peak wavelengths, the plurality of emission faces being arranged in a fixed order repeatedly around a circumference of the ring, and
the controller causes an emission face among the plurality of emission faces to emit a light beam of a selected peak wavelength among the plurality of light beams with different peak wavelengths.

7. The phase-contrast microscope according to claim 1 wherein the plurality of optical fibers comprise multi-mode fibers.

8. The phase-contrast microscope according to claim 1, wherein
the plurality of optical fibers each comprise a core and a clad coating the core, and
the phase-contrast microscope further comprises a clad-mode-light removing section configured to remove clad mode light propagating through the clad.

9. The phase-contrast microscope according to claim 1, wherein
the plurality of optical fibers each comprise a core and a clad coating the core, and
the clad comprises a material to remove clad mode light propagating through the clad.

10. The phase-contrast microscope according to claim 1, wherein
the plurality of optical fibers each comprise a core whose diameter does not exceed a value obtained by dividing a width of the phase film by an imaging magnification of the lens.

* * * * *